United States Patent
Cook et al.

(10) Patent No.: US 11,395,453 B1
(45) Date of Patent: Jul. 26, 2022

(54) WALK-BEHIND POWER SEEDER

(71) Applicant: Stinger Equipment, Inc., LaGrange, KY (US)

(72) Inventors: David Michael Cook, LaGrange, KY (US); Joshua Michael Otto, Crestwood, KY (US)

(73) Assignee: Stinger Equipment, Inc., LaGrange, KY (US)

( * ) Notice: Subject to any disclaimer, the term of this patent is extended or adjusted under 35 U.S.C. 154(b) by 635 days.

(21) Appl. No.: 16/161,788

(22) Filed: Oct. 16, 2018

Related U.S. Application Data

(60) Provisional application No. 62/573,589, filed on Oct. 17, 2017.

(51) Int. Cl.
| | |
|---|---|
| *A01C 5/06* | (2006.01) |
| *A01B 35/28* | (2006.01) |
| *A01C 7/16* | (2006.01) |
| *A01B 49/06* | (2006.01) |
| *A01B 45/02* | (2006.01) |

(52) U.S. Cl.
CPC .............. *A01C 5/064* (2013.01); *A01B 35/28* (2013.01); *A01B 45/02* (2013.01); *A01B 49/065* (2013.01); *A01C 7/16* (2013.01)

(58) Field of Classification Search
CPC ........... A01C 5/064; A01C 7/16; A01B 35/28; A01B 45/02; A01B 45/026; A01B 49/065; A01B 33/028
See application file for complete search history.

(56) References Cited

U.S. PATENT DOCUMENTS

| | | | | |
|---|---|---|---|---|
| 101,540 | A | * | 4/1870 | Altaveau .............. A01B 49/065 111/131 |
| 854,424 | A | * | 5/1907 | Ketterer ......................... 56/253 |

(Continued)

FOREIGN PATENT DOCUMENTS

| | | |
|---|---|---|
| CA | 366396 | 5/1937 |
| EP | 0140898 | 5/1985 |

(Continued)

OTHER PUBLICATIONS

Ryan; Ryan Mataway Overseeder; Retrieved from Internet Wayback Machine on Jul. 22, 2019, but first published Apr. 4, 2015, https://web.archive.org/web/20150404014521/http://www.ryanturf.com/products/ryan-overseeders/ryan-mataway-overseeder/.

(Continued)

*Primary Examiner* — Jamie L McGowan
(74) *Attorney, Agent, or Firm* — Middleton Reutlinger

(57) ABSTRACT

A power seeder may include a frame, one or more wheels, one or more blades capable of cutting into soil, an engine capable of powering the one or more blades, and a seed hopper. The seed hopper may have an opening capable of dispensing seed located forward of the one or more blades. The one or more blades may rotate in an opposite direction to a forward rotation of the one or more wheels. In some embodiments, the seeder may further include a handle for adjusting the height of the one or more blades, a plurality of interlocking teeth, and a spring. The spring may provide a load to counteract the force of gravity on the one or more blades. The aerator may also include a flap located between the opening and the one or more blades.

13 Claims, 17 Drawing Sheets

(56) References Cited

U.S. PATENT DOCUMENTS

| | | | | |
|---|---|---|---|---|
| 925,565 | A * | 6/1909 | Curtis | A01B 45/00 |
| | | | | 111/132 |
| 1,157,670 | A | 10/1915 | Boswell | |
| 1,383,294 | A * | 7/1921 | Gardner, Jr. | A01B 33/028 |
| | | | | 172/42 |
| 1,778,334 | A | 10/1930 | Pedersen | |
| 2,051,443 | A * | 8/1936 | Gravely | A01B 9/006 |
| | | | | 172/43 |
| 2,071,324 | A * | 2/1937 | Bateman | A01C 15/128 |
| | | | | 111/52 |
| 2,205,997 | A | 6/1940 | Wallace | |
| 2,229,497 | A | 1/1941 | Dontje | |
| 2,539,253 | A * | 1/1951 | Jorgensen | A01K 31/04 |
| | | | | 111/132 |
| 2,545,059 | A * | 3/1951 | Ward | A01K 1/015 |
| | | | | 111/132 |
| 2,645,987 | A * | 7/1953 | Brooks | B62D 51/065 |
| | | | | 172/42 |
| 2,667,026 | A * | 1/1954 | Ingram | A01D 34/54 |
| | | | | 56/249 |
| 2,713,816 | A | 7/1955 | Berg | |
| 2,824,506 | A * | 2/1958 | Smithburn | B62D 51/004 |
| | | | | 172/66 |
| 3,140,677 | A * | 7/1964 | Fraser | A01C 7/085 |
| | | | | 111/8 |
| 3,224,512 | A | 12/1965 | Alexander | |
| 3,570,604 | A | 3/1971 | Allard | |
| 3,675,724 | A | 7/1972 | Schneider | |
| 3,685,469 | A * | 8/1972 | Rogers | A01B 45/00 |
| | | | | 111/158 |
| 3,907,053 | A | 9/1975 | Savage | |
| 4,037,544 | A | 7/1977 | Cantone | |
| 4,336,760 | A * | 6/1982 | Cohen | A01B 45/026 |
| | | | | 111/131 |
| 4,550,783 | A | 11/1985 | Hansen | |
| 4,574,890 | A | 3/1986 | Hansen | |
| 4,602,687 | A | 7/1986 | Hansen | |
| 4,638,867 | A | 1/1987 | Hansen | |
| 4,645,012 | A | 2/1987 | Hansen | |
| 4,723,607 | A | 2/1988 | Hansen | |
| 4,750,565 | A | 6/1988 | Hansen | |
| 4,753,298 | A | 6/1988 | Hansen | |
| 4,773,486 | A | 9/1988 | Huber | |
| 4,830,145 | A | 5/1989 | Hansen | |
| 4,867,244 | A | 9/1989 | Cozine | |
| 4,878,802 | A | 11/1989 | Hansen | |
| 4,901,655 | A * | 2/1990 | Magda | A01B 45/00 |
| | | | | 111/133 |
| 4,926,768 | A * | 5/1990 | Magda | A01B 45/00 |
| | | | | 111/11 |
| 4,926,947 | A | 5/1990 | Cozine | |
| 5,375,541 | A * | 12/1994 | McGann | A01B 49/065 |
| | | | | 111/150 |
| 5,398,767 | A | 3/1995 | Warke | |
| 5,628,369 | A | 5/1997 | Brown | |
| 5,680,903 | A | 10/1997 | Oliver | |
| 5,974,771 | A | 11/1999 | Greenan | |
| 6,102,129 | A | 8/2000 | Classen | |
| 6,249,993 | B1 | 6/2001 | Armstrong | |
| 6,273,197 | B1 * | 8/2001 | Marlow | A01B 45/02 |
| | | | | 172/122 |
| 6,347,593 | B1 * | 2/2002 | Moran | A01B 45/00 |
| | | | | 111/133 |
| 6,708,773 | B1 | 3/2004 | Kinkead | |
| 6,941,739 | B1 * | 9/2005 | Gliser | A01D 42/00 |
| | | | | 172/272 |
| 7,392,854 | B2 * | 7/2008 | Ikeda | A01B 33/028 |
| | | | | 172/354 |
| 8,291,991 | B1 | 10/2012 | Cook | |
| 8,733,477 | B1 | 5/2014 | Cook | |
| 9,623,903 | B2 | 4/2017 | Cook | |
| 9,750,172 | B2 * | 9/2017 | Moore | A01B 63/008 |
| 10,779,455 | B1 | 9/2020 | Cook | |
| 10,999,964 | B1 | 5/2021 | Cook | |
| 2003/0201107 | A1 | 10/2003 | Smith | |
| 2004/0069194 | A1 * | 4/2004 | Wyne | A01C 17/001 |
| | | | | 111/13 |
| 2006/0048952 | A1 | 3/2006 | Classen | |
| 2007/0074645 | A1 * | 4/2007 | Kinkead | A01C 5/064 |
| | | | | 111/166 |
| 2008/0229987 | A1 * | 9/2008 | Dryden | A01B 45/026 |
| | | | | 111/178 |
| 2010/0044125 | A1 | 2/2010 | Witzigman | |
| 2012/0298022 | A1 * | 11/2012 | Bowen | A01C 7/008 |
| | | | | 111/69 |
| 2015/0107863 | A1 * | 4/2015 | Bryant | A01B 63/008 |
| | | | | 172/21 |
| 2016/0227702 | A1 * | 8/2016 | Lietaer | A01B 49/065 |
| 2017/0311533 | A1 * | 11/2017 | Lapp | A01B 45/02 |
| 2019/0217319 | A1 * | 7/2019 | Harvey | B05B 12/02 |
| 2019/0357417 | A1 * | 11/2019 | Chahley | A01B 63/166 |

FOREIGN PATENT DOCUMENTS

| | | |
|---|---|---|
| EP | 2491777 | 7/2019 |
| GB | 472443 | 9/1937 |
| GB | 965436 | 7/1964 |
| GB | 2347400 | 9/2000 |

OTHER PUBLICATIONS

The Toro Company, 20" Hydraulic Slit Seeder, 2019, https://www.toro.com/en/professional-contractor/turf-renovation-specialty-equipment/20-hydraulic-slit-seeder.
Billy Goat Industries, Inc., Overseeders & Power Rakes, 2019, https://www.billygoat.com/na/en_us/products/overseeders-power-rakes.html.
Bluebird Turf, 22 in. BlueBird Seeder 30-lb capactiy polymer hopper S22, 2019, https://bluebirdturf.com/product/s22-seeder/.
Lawn Solutions 24" Dual Hydro Aeroator You Tube Nov. 17, 2010.
Lawn Solutions Riding Aerator You Tube Nov. 28, 2010.
Turfco XT5 Hydro Aeroator You Tube Mar. 24, 2016.
Classen PowerSteer Aerators Power The Turn, You Tube Video, https://www.youtube.com/watch?v=d4zA1n2bHPI, published Apr. 7, 2015.
Turfco Direct TurnAer Aerators, You Tube Video, https://www.youtube.com/watch?v=y2cuc0MNSIc, published Jul. 16, 2009.
Classen Riding Aerator, You Tube Video, https://www.youtube.com/watch?v=Jl7nNjDl6D8, published Jul. 27, 2010.
Exmark Manufacturing Inc., 24" Stand-On Aerator, You Tube Video, https://www.youtube.com/watch?v=RAMkD4AKRgl, published Dec. 29, 2017.
U.S. Appl. No. 63/091,031, filed Oct. 13, 2020 titled Vehicle Articulating and Caster Steering.
U.S. Appl. No. 63/088,288, filed Oct. 6, 2020 titled Seeding Attachment for Riding Aerator.

* cited by examiner

WALK-BEHIND POWER SEEDER

CLAIM TO PRIORITY

This non-provisional patent application claims priority to and benefit of, under 35 U.S.C. § 119(e), U.S. Provisional Patent Application Ser. No. 62/573,589, filed Oct. 17, 2017, and titled "Walk-Behind Power Seeder", all of which is incorporated by reference herein.

TECHNICAL FIELD

Generally, a walk-behind power seeder is taught.

BACKGROUND

Conventionally, power seeders are utilized to thicken existing lawns or ornamental turf, and to establish new lawns. Power seeders may come in large tractor mounted units and small walk-behind units. Smaller walk-behind units may be desirable for use with residential lawns, due to hills and obstacles residential lawns may include. Smaller walk-behind units may also be desirable for residential lawns because of their size and ease of transport.

Generally, the purpose of power seeders is to puncture, or expose the soil, and to deliver seed in measured amounts in order that the seed may be allowed to germinate evenly, so that the lawn may be thickened or so that new turf may be established. Conventional seeders function by dropping seed in front or the back of the seeder, blades then spin in order to cut grooves in the surface of the ground, thus providing a place for the seeds to germinate. The blades of conventional seeders spin in the direction of travel of the machine, which may result in dirt and/or rocks being thrown backwards toward an operator and come into contact with the operator's feet and legs. This may result in the operator becoming covered in dirt which may not be desired.

Furthermore, when blades spin in the direction of travel over hard ground, they have a tendency to ride on top of the ground rather than digging or cutting into the dirt. For best seed germination, it may desirable to create a groove, or opening, in the ground ranging from about ¼ inch to about ½ inch deep. With the traditional blade action and design, this is often not achievable. When an about ¼ inch to about ½ inch deep groove, or opening, in the ground is not achieved the percentage of seed that germinates may be decreased.

Residential lawns are often comprised of hills and varying types of terrain. This varying terrain may require an operator to adjust the blade depth repeatedly to achieve the desired depth of about ¼ inch to about ½ inch deep grooves, or openings, in the ground. With this need to adjust the depth frequently, it may be desired to have a machine that can quickly and easily be adjusted by an operator with just one hand. Traditional power seeders may require an operator to stop the machine, turn off the blades, walk around the machine in order to make the necessary adjustment, and then walk back behind the machine, turn on the blades, and continue operation of the seeder.

Additionally, maintaining the belt drive may also be problematic on conventional power seeders. Specifically, on conventional power seeders with transmissions the transmission belts may wear out between maintenance and adjustment intervals. It may be desirable to have a transmission belt that is self-tensioning, so that the belts may last longer between maintenance or adjustment intervals.

With these issues, an improved walk-behind power seeder is desired by both professionals and homeowners. There is a need in the art for a seeder that may not throw dirt and/or debris back at the operator, for a power-seeder that may be capable of cutting into hard dirt and clay (as opposed to riding on top of the ground), and a power seeder wherein the belts may be easy to adjust the depth, and where the belts may not require adjustment as often.

SUMMARY

Generally, a power seeder is provided. The power seeder may include a frame having at least a front and a back, one or more wheels, one or more blades capable of cutting into soil, an engine capable of powering the one or more blades, and a seed hopper. The seed hopper may have an opening capable of dispensing seed and the seed hopper may be mounted to the frame such that the opening may be located forward of the one or more blades. The one or more blades may rotate in an opposite direction to a forward rotation of the one or more wheels. In some embodiments, the seeder may further include a handle for adjusting the height of the one or more blades, and a shaft connected to the one or more blades. The handle may be connected to the shaft. In some embodiments, the opening may include a seed metering gate. The aerator may also include a flap located between the opening and the one or more blades. In some embodiments, the engine may be capable of being engaged to cause rotation of the one or more blades and capable of being disengaged to stop rotation of the one or more blades.

In some embodiments, the power seeder may include a frame, one or more blades capable of cutting into soil, an engine capable of powering the one or more blades, a handle, and a plurality of interlocking teeth. Activation of the handle may disengage the plurality of interlocking teeth allowing the handle to move and adjust the height of the one or more blades. Deactivation of the handle may engage the plurality of interlocking teeth preventing movement of the handle. The aerator may further include a shaft connected to the one or more blades and wherein the handle is connected to the shaft.

In some embodiments, the power seeder may include a frame, one or more blades capable of cutting into soil, an engine capable of powering the one or more blades, a handle, a spring, and a shaft connected to the one or more blades, the handle, and the spring. The handle may be capable of being activated by a user allowing the handle to adjust the height of the one or more blades, and wherein the spring provides a load to the shaft to counteract the force of gravity on the one or more blades. Movement of the handle in a forward direction rotates the shaft against a force being applied to the shaft by the spring to lower the height of the one or more blades. Movement of the handle in a rearward direction rotates the shaft with the force being applied to the shaft by the spring to raise the height of the one or more blades.

DETAILED DESCRIPTION

Figure 1:
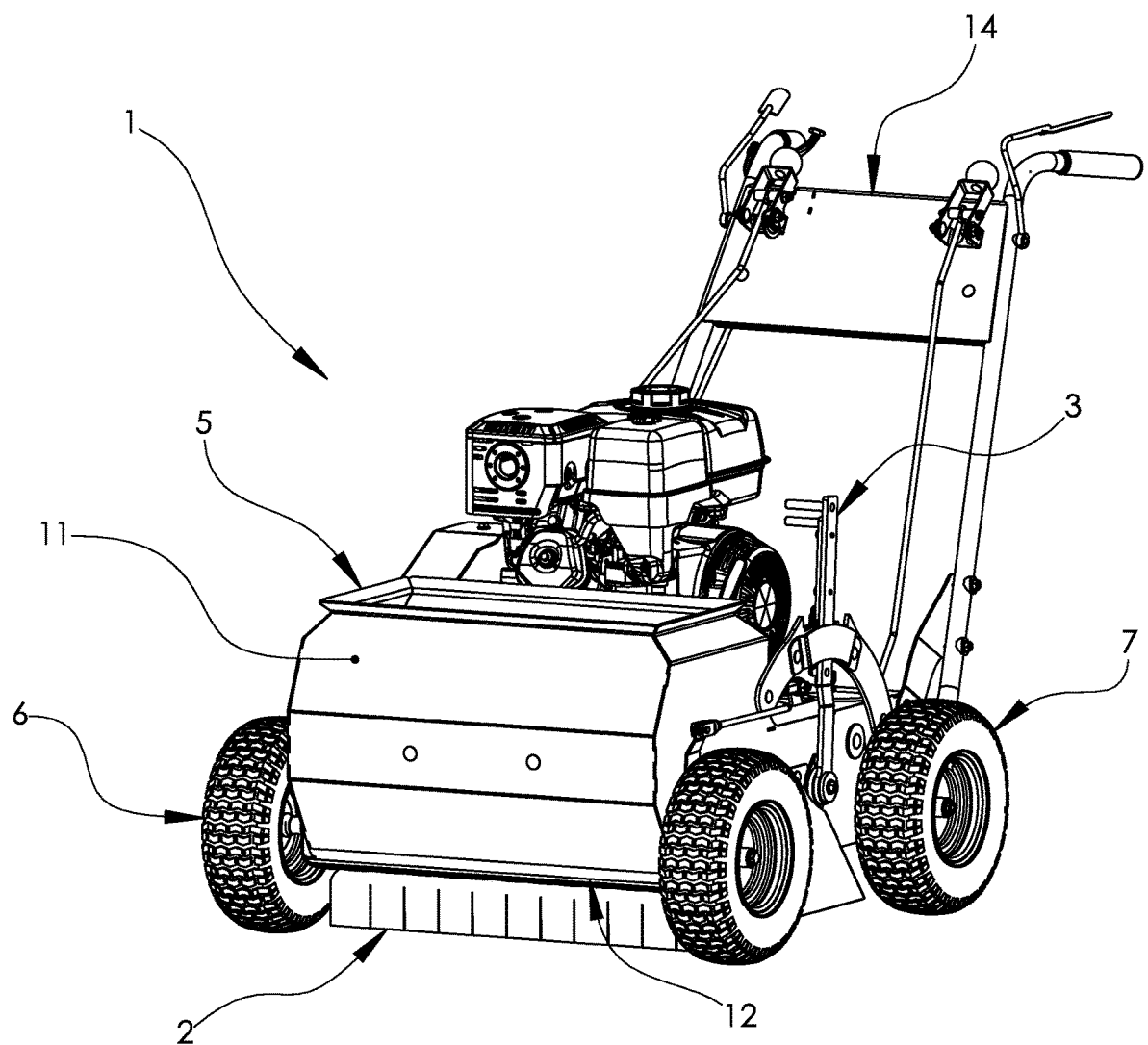
FIG. 1 is a perspective view of an exemplary embodiment of a power seeder.
Figure 2:
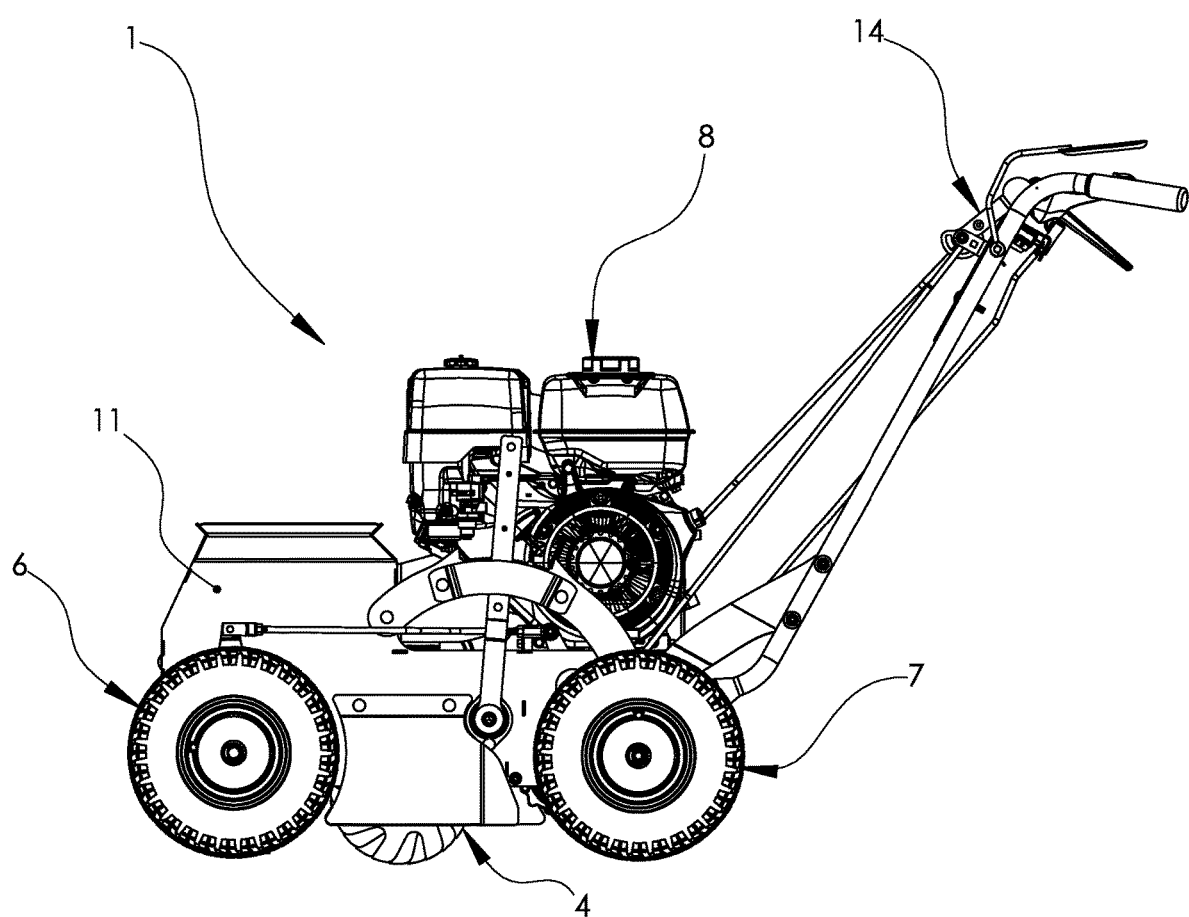
FIG. 2 is a side view of the power seeder in FIG. 1.
Figure 3:
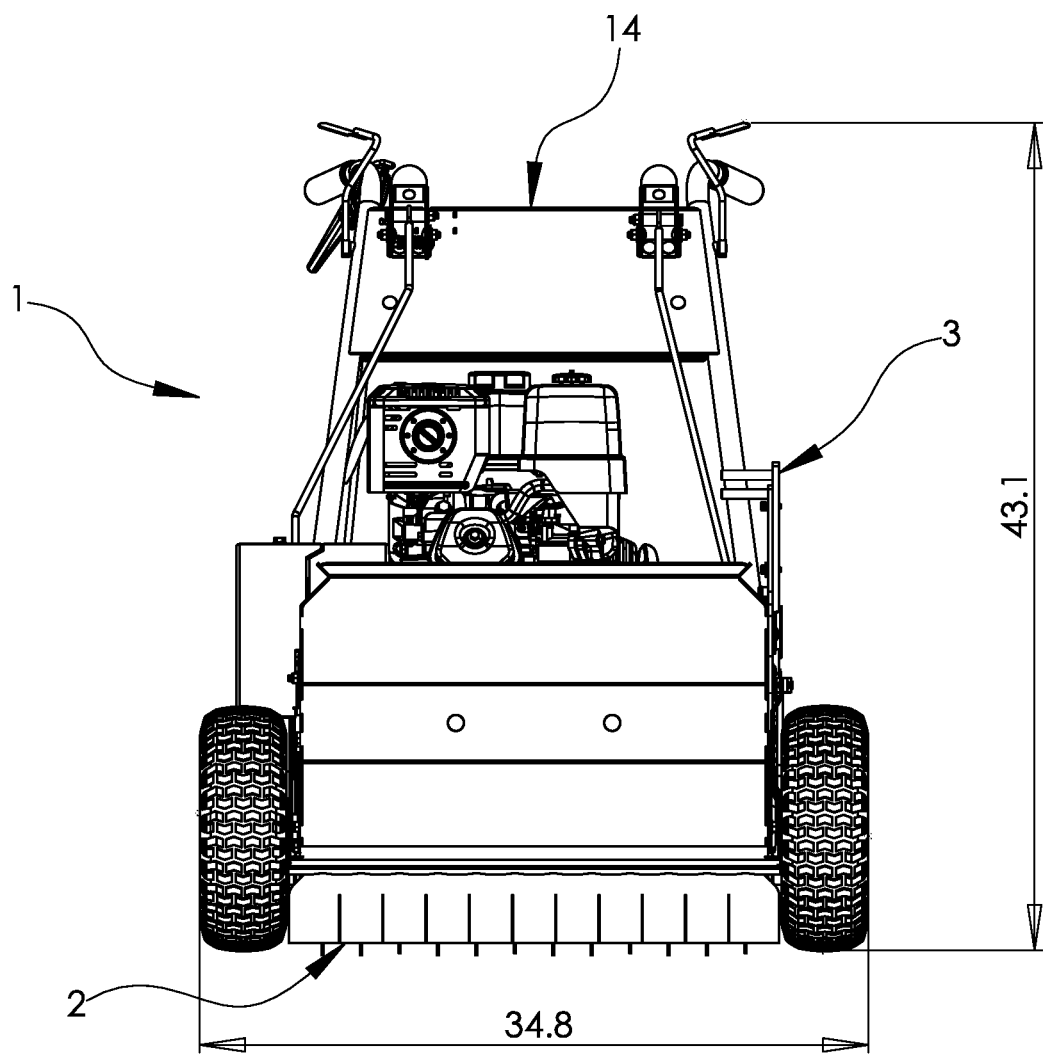
FIG. 3 is a front view of the power seeder in FIG. 1.
Figure 4:
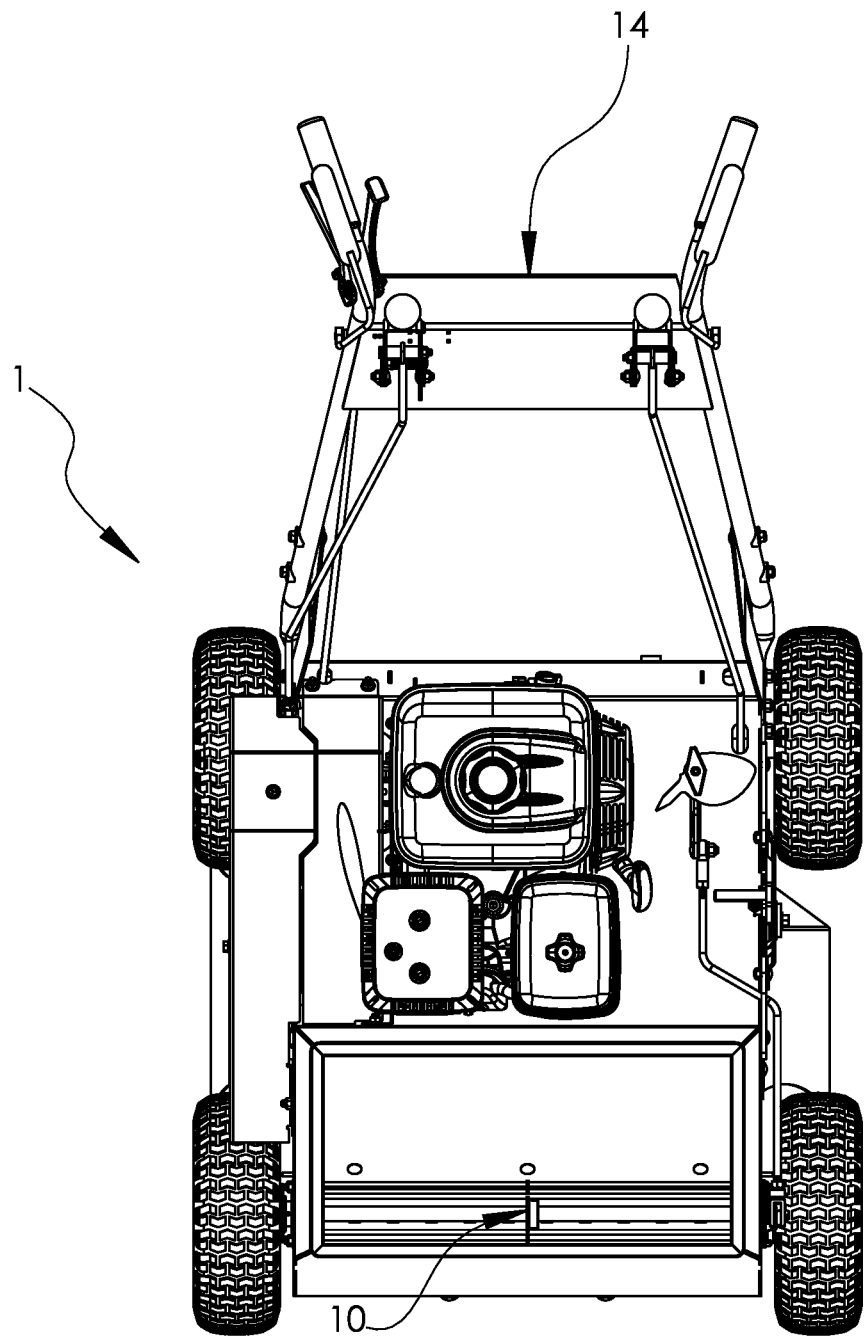
FIG. 4 is a top view of the power seeder in FIG. 1.

FIGS. 1-17 illustrate an exemplary embodiment of a power seeder 1 described herein. The dimensions shown in FIGS. 1-17 are in inches unless otherwise noted; however, the dimensions provided are solely for illustrative purposes and are not intended to be limiting. A person of skill in the art will recognize that the dimensions of a power seeder, and various components therein, may vary depending on a variety of factors.

Referring now generally to FIGS. 1-5, an example embodiment of a power seeder device 1 is illustrated in varying views. The illustrated embodiment of the power seeder 1, may include one or more front wheels 6 and one or more rear wheels 7, and a frame 5 on which an engine 8 may be mounted in order to supply power to a transmission 9 and to turn one or more blades 4 on the cutter shaft 24 by transmitting power through one or more blade belts 15. The power seeder 1 may also include a handle assembly for use by an operator to drive to the power seeder 1. The handle assembly may include any handle types and structures known in the art. A seed hopper may further include a seed hopper 11 for insertion of seed into the device 1, a seed hopper mixer 10 for mixing the contents of the hopper 11, a seed metering gate 12 for determining the output of seed from the device 1, and a flexible flap 2 (discussed in detail herein).

The frame 5 may also support a front axle shaft 25 mounted with the front axle bearing in order to turn the seed hopper mixer 10. The seed metering gate 12 may also be mounted to the front axle 25 with a bearing to allow it to pivot around the front axle shaft 25 to adjust the size of the opening in the bottom of the seed hopper 11 for a calibrated seed delivery. The frame 5 also supports the operator handle assembly 14, which is connected to the frame 5.

Figure 6:
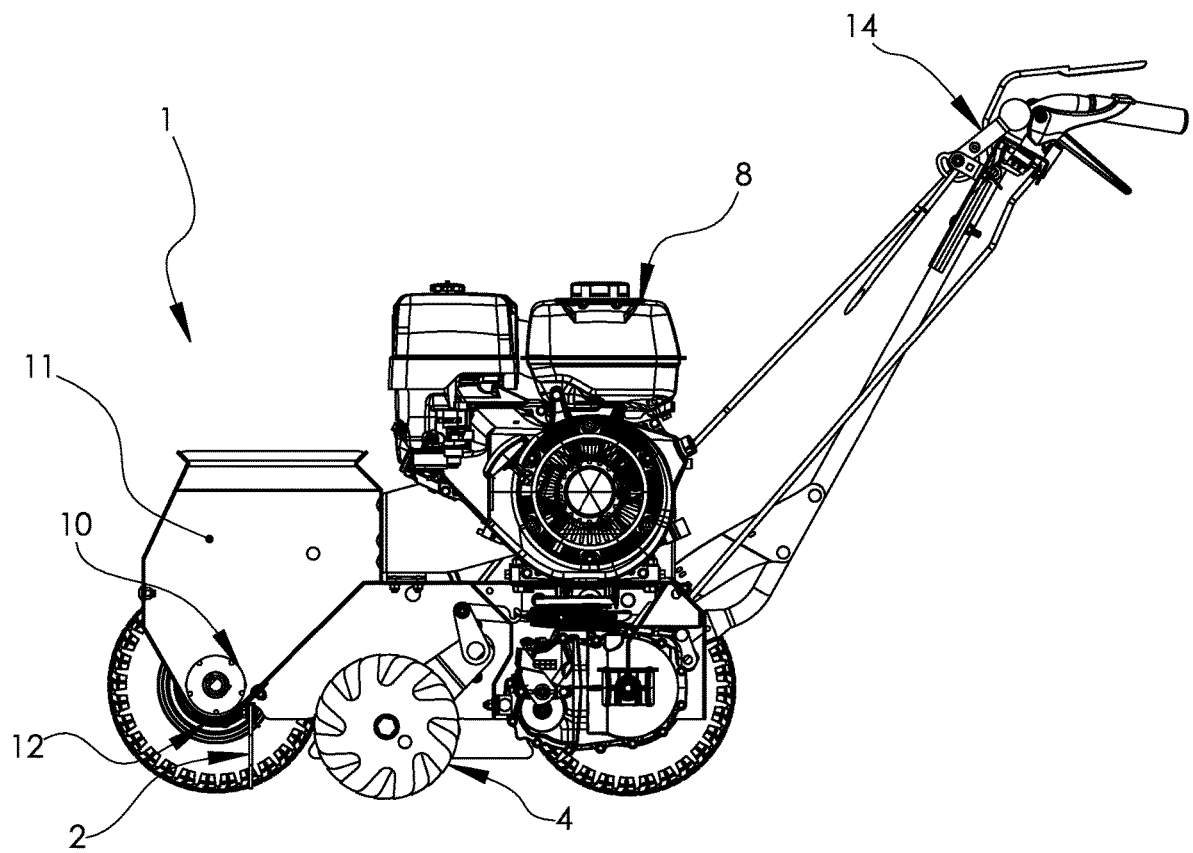
FIG. 6 is a cross sectional view of the power seeder of FIG. 1
Figure 7:
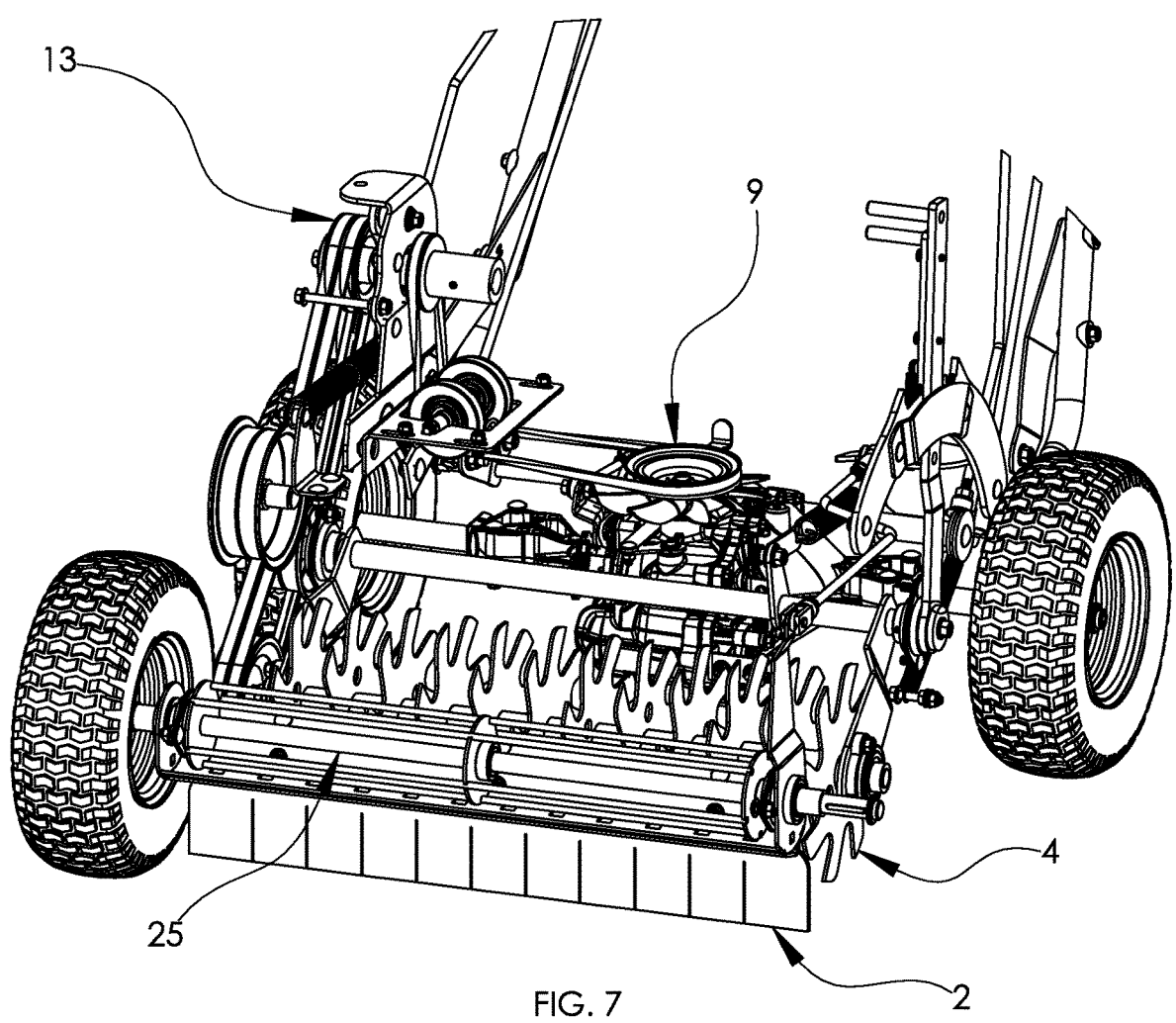
FIG. 7 is a detailed perspective view of the power seeder in FIG. 1 with the frame, covers, and one front wheel removed.

Referring now to FIGS. 6 and 7, in particular, FIG. 6 because it illustrates a cross-sectional view of power seeder 1 with the frame removed in order to show the internal components. FIG. 7 illustrates a perspective view of power seeder 1 with the frame removed, so that the internal components may be visualized. Seed hopper 11 may be designed to hold grass seed. The size, shape, and volume of the seed hopper may vary, and are not limited to the embodiment illustrated. Seed mixer 10 may be connected to the front axle shaft 25 (illustrated in FIG. 6) and driven by the one or more front wheels 6. The seed mixer may function to homogenize the seed contained within the hopper, so that the seed expelled, and delivered to the ground is of a more uniform composition. In some embodiments, such as illustrated in the Figures herein, the seed mixer 10 may rotate, for example as the one or more front wheels rotate; however, this is not intended to be limited, as those of skill in the art may recognize alternative way to mix and homogenize seeds prior to dispensing.

Figure 5:
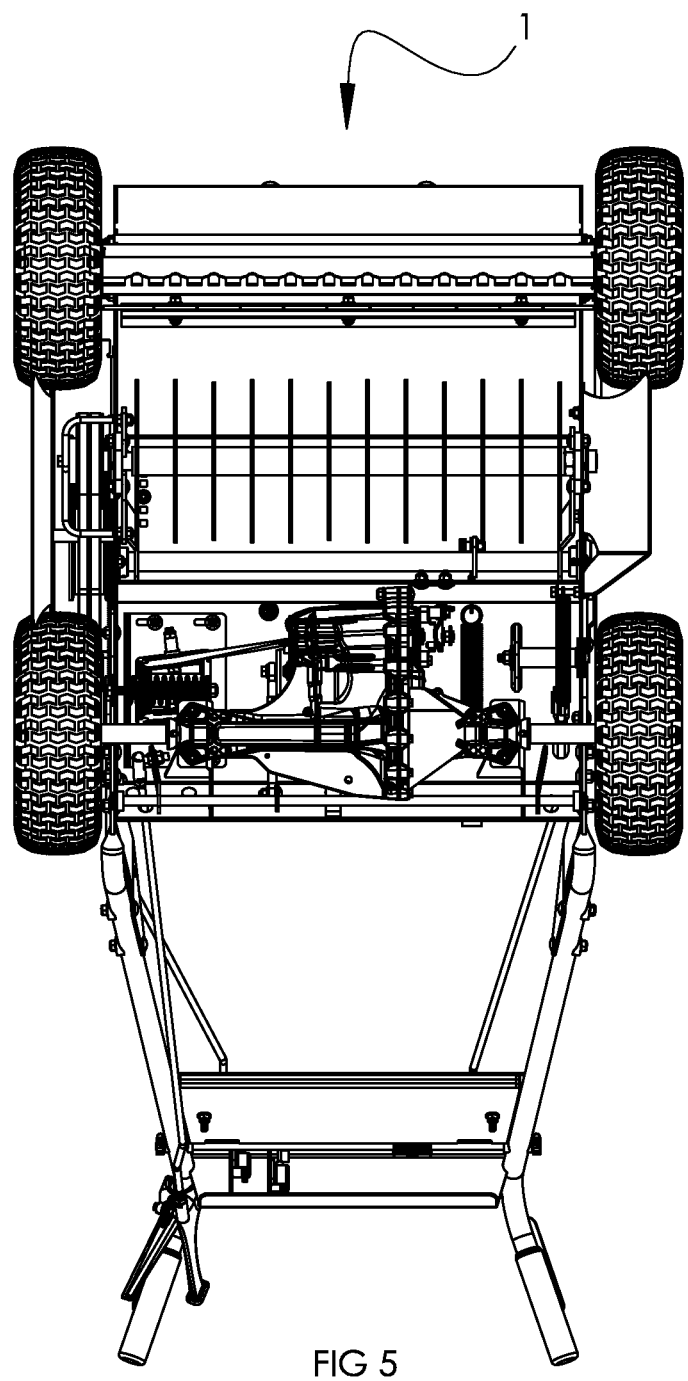
FIG. 5 is bottom view of the power seeder in FIG. 1.

Contrary to conventional power seeders, where the blades of a power seeder rotate in the same direction as the power seeder is moving (i.e. the same direction of the wheels), the one or more blades 4 may rotate counter to the direction of travel. In the view illustrated in FIG. 6, the power seeder 1 travels from right to left and the one or more blades 4 spin in a clockwise orientation. This rotation may cause one or more blades 4 to cut a groove in the ground, resulting in the removal of dirt; the dirt that is removed may be thrown upward and forward (towards the direction of travel). These counter rotating blades 4 may improve upon conventional machines, where the blades move in the direction the machine travels (i.e. as shown in FIG. 5, counter clockwise). For example, the counter rotating blades 4 may allow the machine to dig into hard compacted soil more efficiently, thus providing a better environment for seed to germinate. Additionally, the counter rotating blades 4 may allow for better seed to soil contact, as dirt is allowed to fall on top of the seed(s) after passing under a rubber flap 2 (discussed in more detail below).

A flexible flap 2 may be located directly behind the seed drop area. This flexible flap may be comprised of rubber, or any other material known in the art to provide both flexibility and support. This flexible flap 2 may serve multiple functions. For example, flexible flap 2 may keep dirt and debris from building up on the seed metering gate 12. Furthermore, the flexible flap 2 may assist in covering the seed with soil during the seeding process. As the one or more blades 4 throw the dirt and debris upward and forward, the dirt and debris may strike the bottom of the frame 5 and an interior (facing the blade) side of the flexible flap 2. The flexible flap 2, because of its location behind the seed drop area, the flexible flap 2 may prevent the build-up of dirt and debris at the seed metering gate 12. Furthermore, the flexible flap 2 may allow this dirt to fall down the interior side of the flap 2, which may cover the seed recently deposited from the seed metering gate 12 with soil. This nearly immediate covering of the deposited seed with soil may increase the overall seed-to-soil contact, which may increase the germination rate of the seed.

Figure 8:
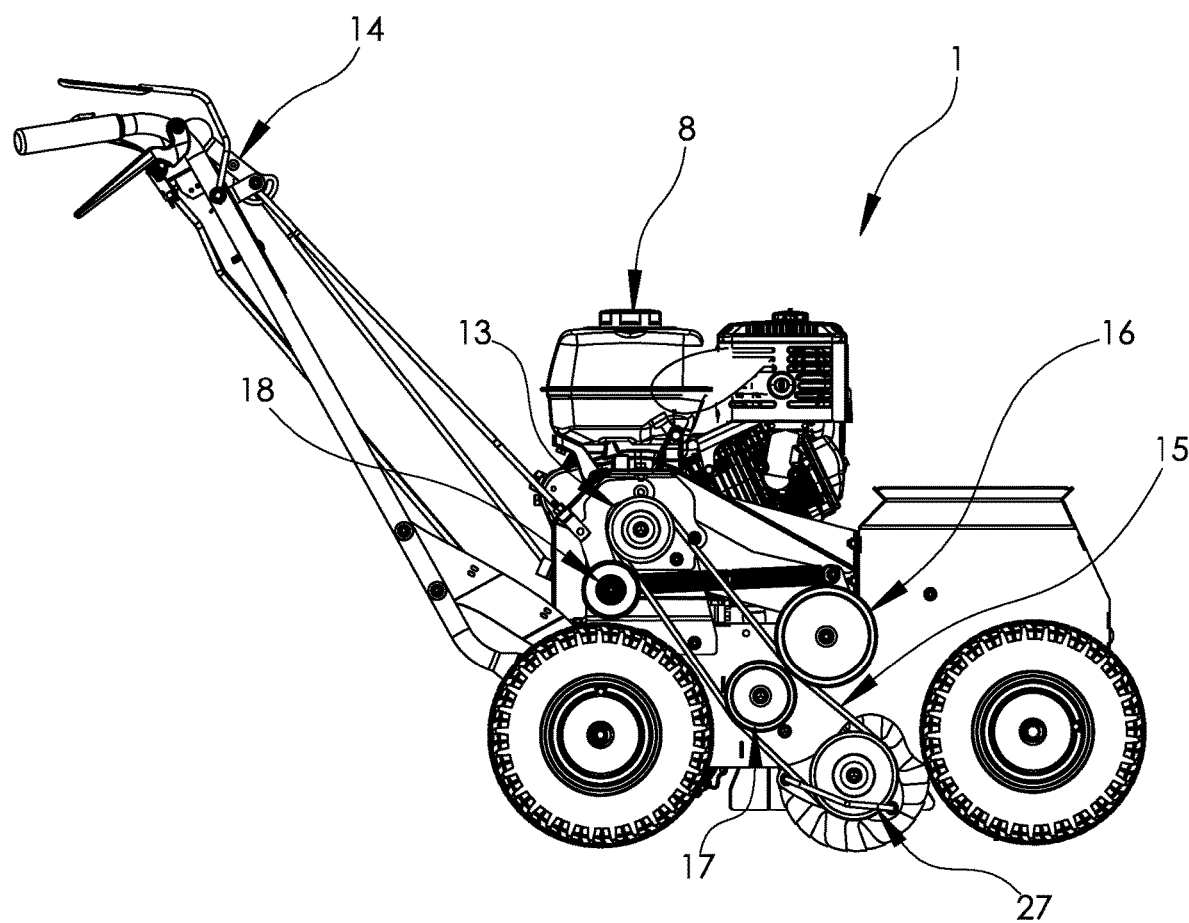
FIG. 8 is a side view of the power seeder in FIG. 1 with the belt cover removed.

Referring now to FIG. 8, the right side of power seeder 1 is illustrated with the belt cover removed. Engine 8 is connected to an engine blade drive pulley 13 through a belt 15, this allows for rotational power to be translated through the belt 15 to a blade drive pulley 27. A person of skill in the art may recognize that the specifications of the engine may vary, for example based on the size of the power seeder 1 or the type of terrain for which the power seeder 1 is designed to be used. Furthermore, a person of skill in the art may recognizes that a variety of types and sizes of belts may be utilized as well.

A control lever located on, or incorporated as a part of, handle assembly 14 allows a belt tension idler 18 to move in a first direction (e.g. forward, or to the right, in FIG. 8) in order to tighten the belt 15 and turn the blades 4 on. While such a control lever is illustrated on the handle assembly, particularly on a top portion of the handle assembly, this is not to be understood as limited, as a control lever may be located anywhere on the apparatus deemed appropriated by one of skill in the art. This control lever located on the handle assembly 14 may also allow for movement of the idler 18 in a second direction opposite of the first direction (e.g. backward, or to the left, in FIG. 8) in order to allow for slack in the belt 15, which allows the blades 4 stop spinning, thus turning them off. One or more idlers, for example a first idler 16 and a second idler 17 illustrated in FIG. 8 may help keep the effective length of belt 15 constant as the one or more blades 4 are raised and lowered into the ground.

Figure 9:
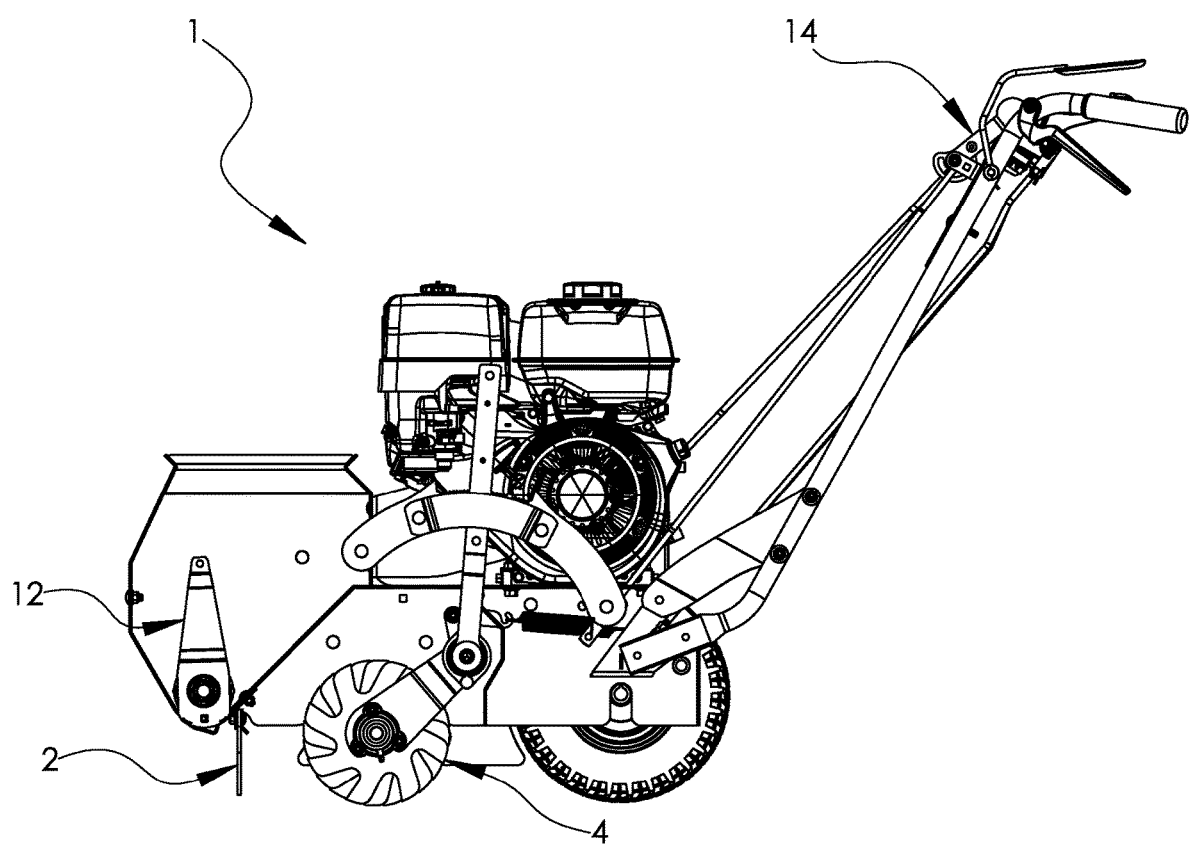
FIG. 9 is a cut-away side view of the power seeder in FIG. 1 with transmission removed.
Figure 10:
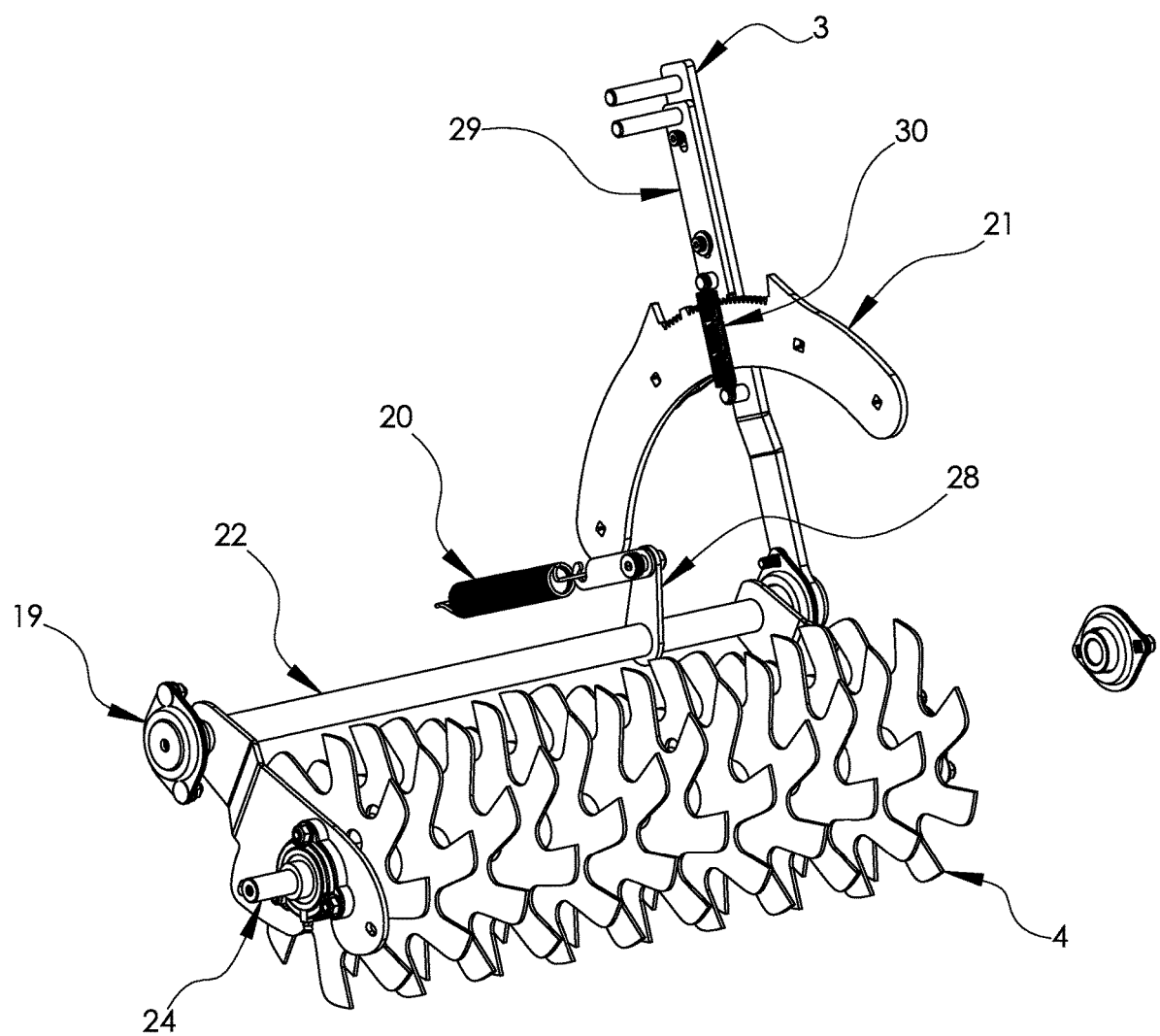
FIG. 10 is a perspective view of the cutter reel and depth control of the power seeder in FIG. 1.
Figure 11:
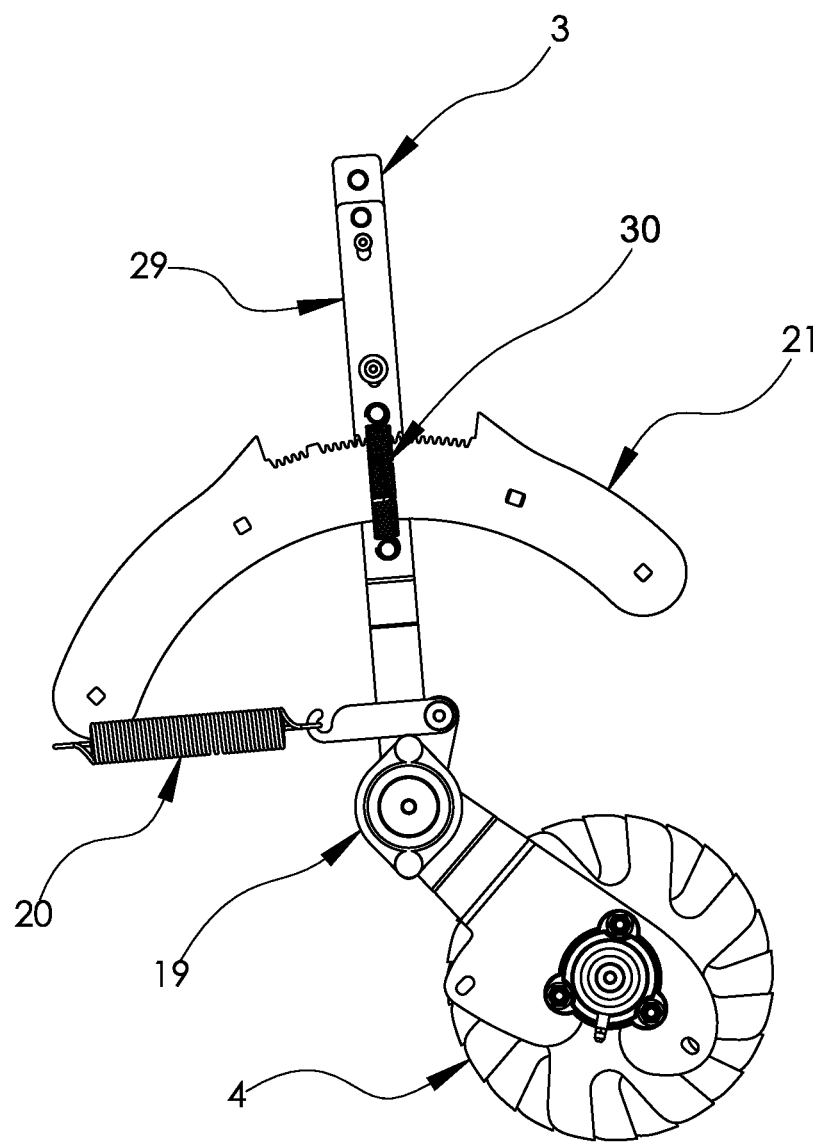
FIG. 11 is a side view of the cutter reel and depth control of the power seeder in FIG. 1.

Referring now to FIGS. 9-11, where cutter reel and depth assembly may be seen in greater detail. FIG. 9 illustrates a similar view of powered seeder 1 as shown in FIG. 6, except a side of the frame 5 is removed to expose the internal components, and the transmission 9 has also been removed in order to see additional detail. FIG. 10 illustrates a perspective view of the cutter reel and blade depth assembly utilized with power seeder 1. FIG. 11 illustrates a more detailed perspective of the depth assembly mechanism of power seeder 1. The cutter reel may include one or more blades 4 mounted on the cutter shaft 24, and which may be able to rotate about pivot shaft 22 by pivoting on bearing 19 that is mounted to the frame 5. However, this mechanism of rotation is not intended to be limited, as the one to more blades may be rotated by any means known in the art. A first spring 20 applies a load to a pivot arm bracket 28, extending from the pivot shaft 22, which results in a rotational force counteracting gravity and acting on the cutter reel assembly. Spring 20 receives a majority of the weight associated with the cutter shaft assembly, thus minimizing the weight felt by an operator when the operator adjusts the height of the one or more blades using a depth handle 3. Spring 20 may facilitate the adjustment of height of one or more blades 4 by making the adjustment easier and more precise for an operator.

Furthermore, FIG. 10 illustrates the mechanism for adjusting the height of the one or more blades 4 of the cutter reel. An operator may squeeze, or compress, the depth handle 3, moving it so that it is closer to or against a sliding handle 29. This squeezing action may disengage a second spring 30 from a plurality of interlocking teeth, allowing the plurality of interlocking teeth positioned between the sliding handle 29 and the depth plate 21 to move the handle forward and backward easily by the operator. When the operator releases the two handles into an uncompressed state, spring 30 may re-engage the plurality of interlocking teeth, which may hold the blades at the desired height selected by the operator. In some embodiments, this squeezing or compression action may be accomplished by a single hand of a user; however, this is not intended to be so limiting.

Figure 12:
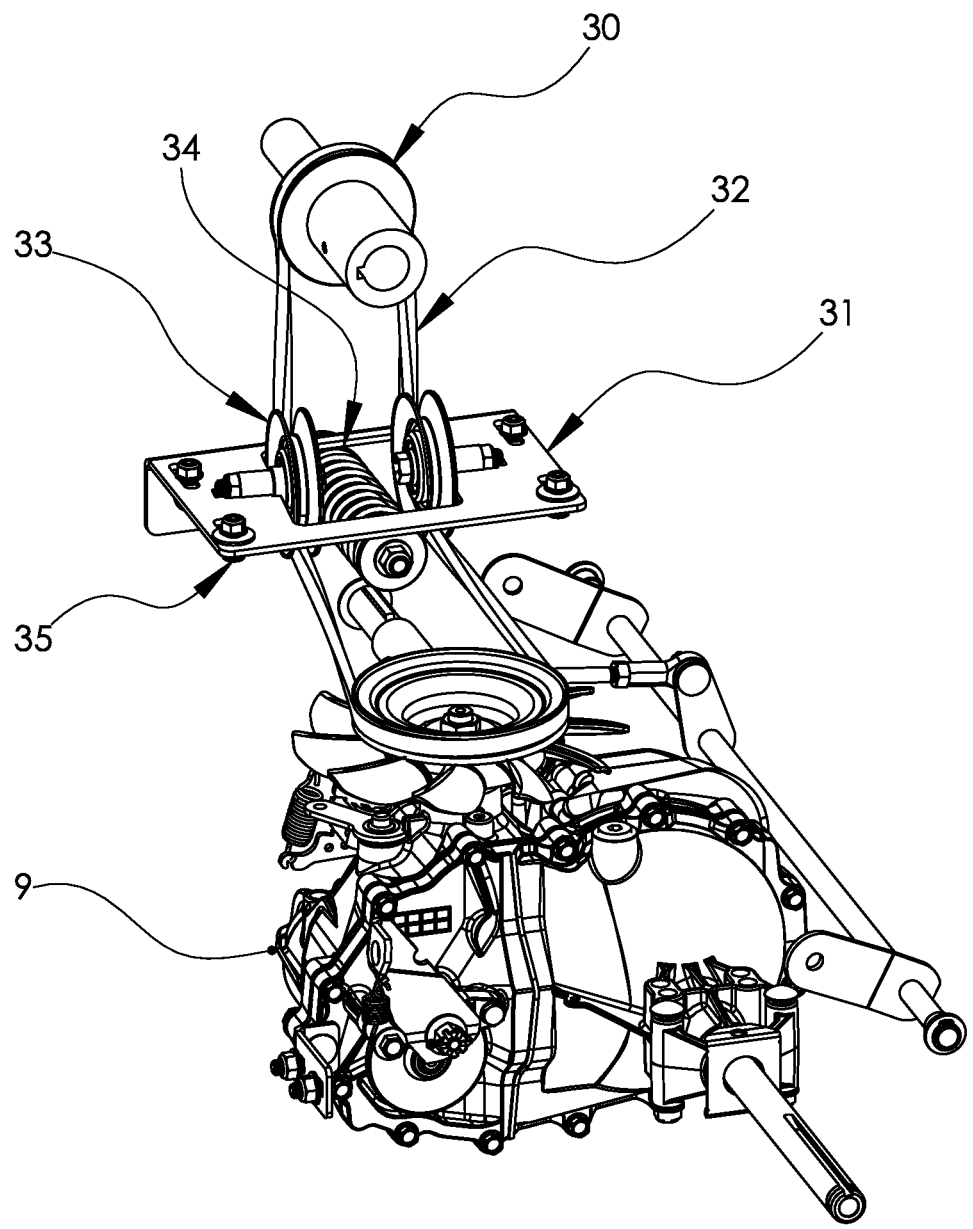
FIG. 12 is a perspective view of the transmission, transmission belt, transmission belt tensioner, and transmission drive pulley of the power seeder in FIG. 1.
Figure 13:
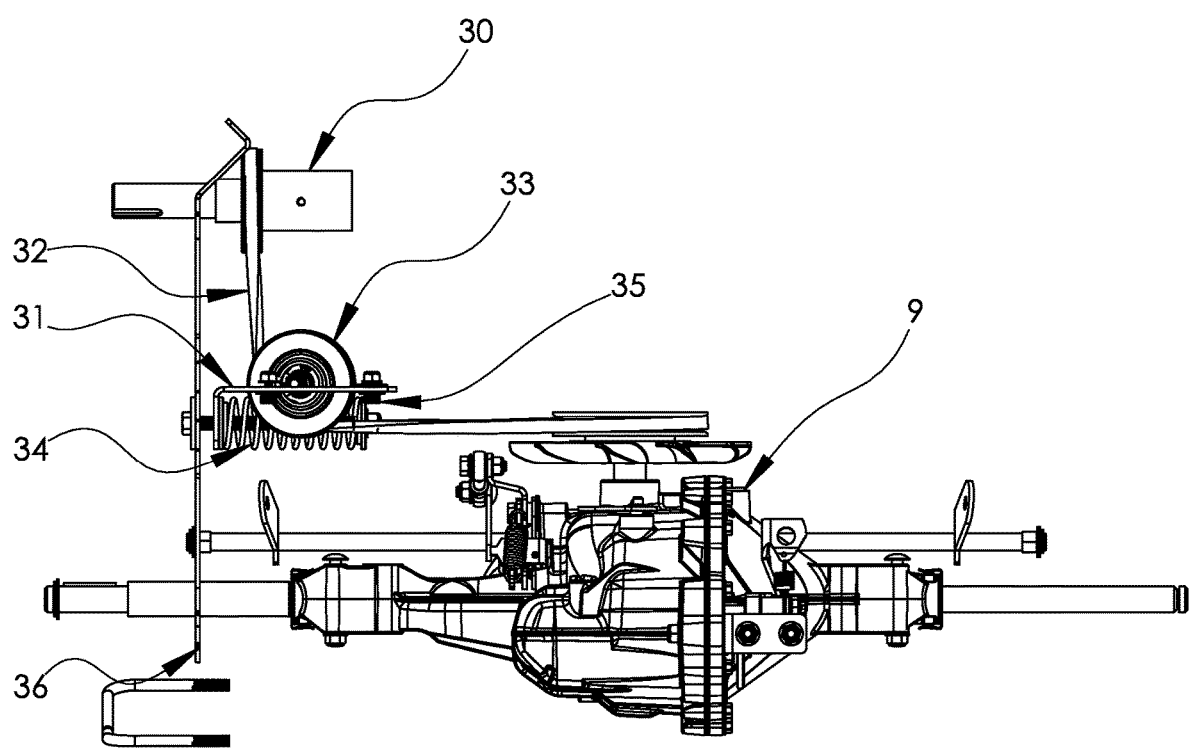
FIG. 13 is a front view of FIG. 12.

Referring now to FIGS. 12 and 13, where a transmission portion of the power seeder 1 is illustrated. In particular, FIG. 12 illustrates a portion of power seeder 1 from a transmission belt drive to a transmission drive pulley 30 to the transmission 9. A spring-loaded transmission idler plate 31 may have one or more idler pulleys 33 bolted to it. In some embodiments, the transmission idler plate may have two pulleys 33 bolted to it, but this is not to be understood as limiting. The spring-loaded transmission idler plate 31 may have one or more holes through which one or more shoulder bolts may extend through and attach to the frame 5. In some embodiments, the spring-loaded transmission idler plate 31 may be substantially rectangular in shape, but this is not intended to be limiting. In some embodiments, the substantially rectangular shaped spring-loaded transmission idler plate 31 may have four holes (i.e. one at each corner of the rectangle) through which four shoulder bolts may extend through and attach to the frame 5; however, this is not intended to be limiting. The spring-loaded transmission idler plate 31 may be allowed to move or slide along these one or more holes due to the connectivity of the shoulder bolt 35 to frame 5. A third spring 34 coupled with the spring-loaded transmission idler plate 31 may allow for constant tension to remain on a transmission belt 32, which turns at an approximately 90 degree angle and twists. This constant tension allows the belt 32 to stretch and wear over time, meaning the operator does not have to adjust the tension on the belt 32.

FIG. 13 illustrates a front view of the transmission portion also illustrated in FIG. 12 with a portion of the frame 36 shown. Furthermore, FIG. 13 illustrates how the third spring 34 may be compressed and pushes the spring-loaded transmission idler plate 31 toward the portion of the frame 36 in order to maintain a constant tension on the transmission belt 32. Both the transmission idlers pulleys 33 may move together with the idler 31 using the compression spring, the third spring 34. Because of this, the transmission idler plate 31 may only have to move half as much in order to accommodate for belt wear, which helps keep the belt vertically aligned with the transmission drive pulley 30. This may increase the life of the belt and reduce the amount of maintenance required.

Figure 14:
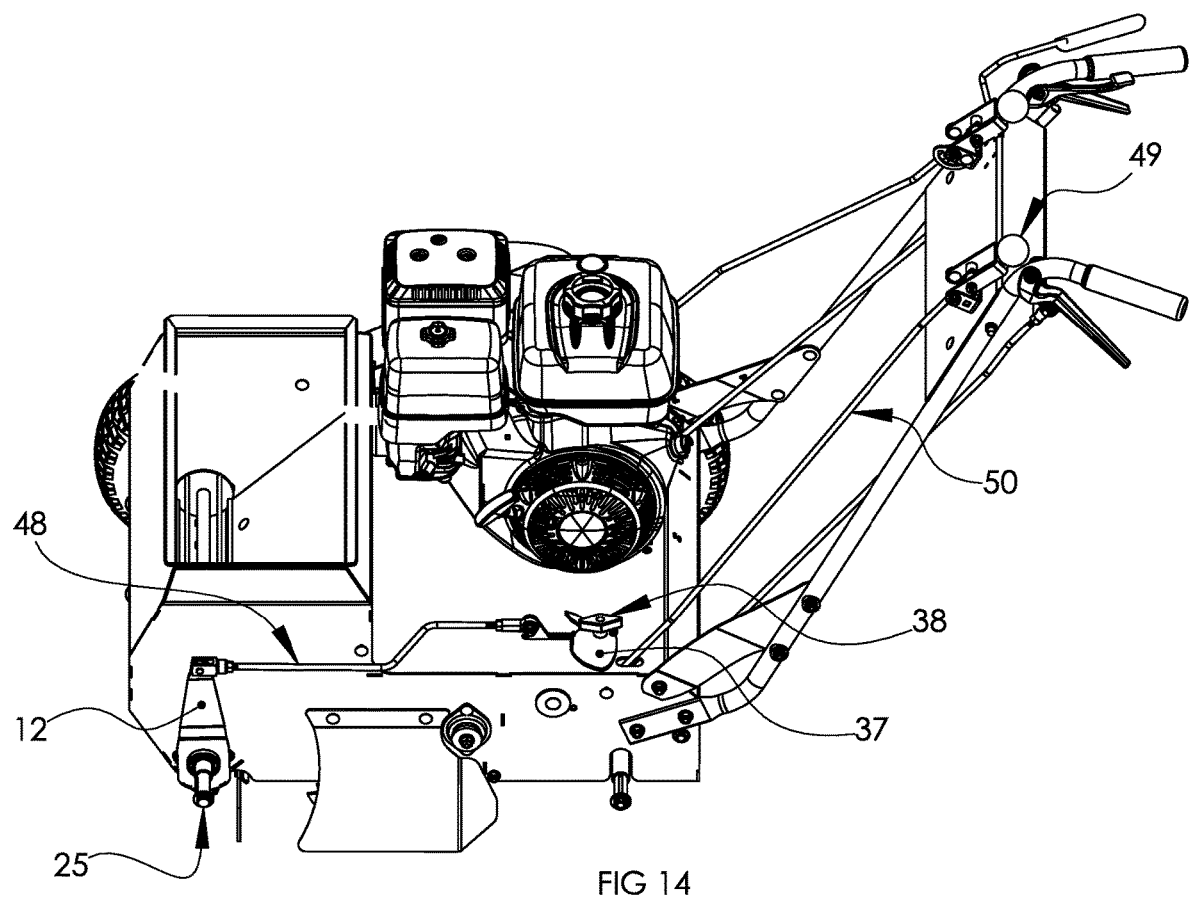
FIG. 14 is a side perspective view of the seed flow controls of the power seeder of FIG. 1.
Figure 15:
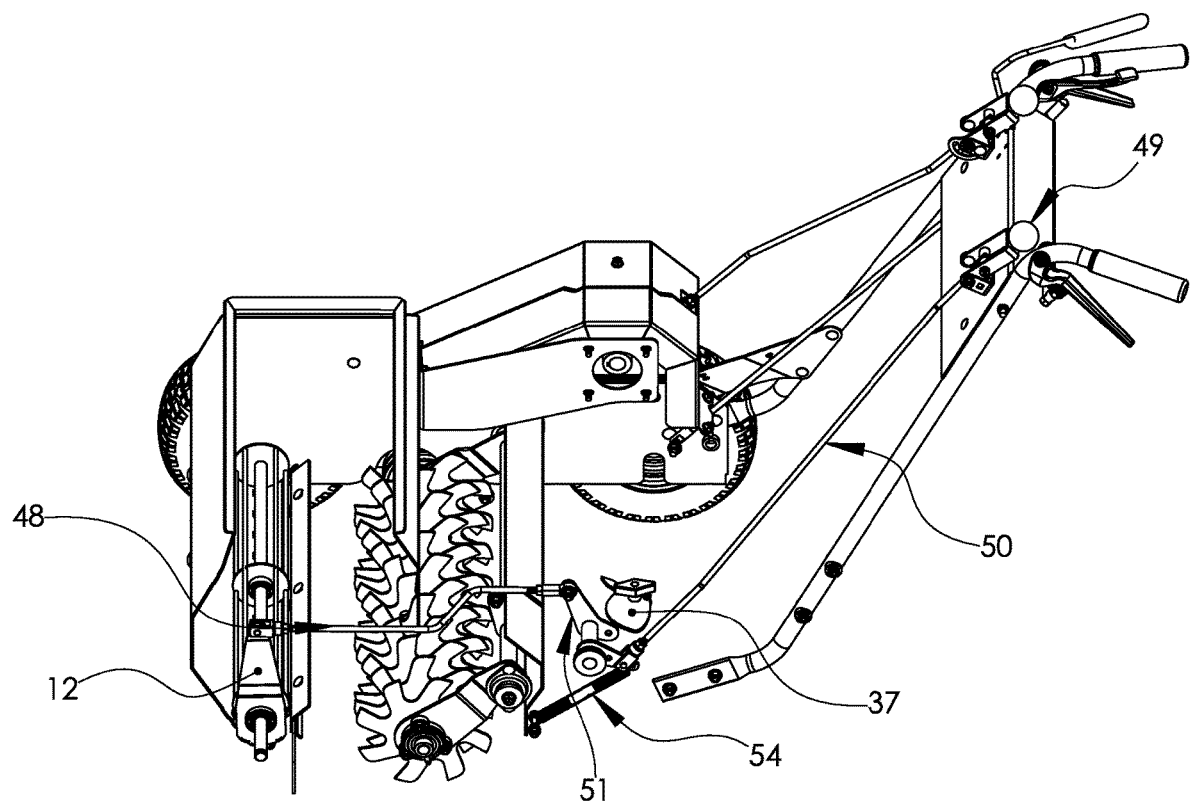
FIG. 15 is a side perspective view of the seed flow controls of the power seeder of FIG. 1 with the side of the frame, depth arm assembly, engine, and other miscellaneous hardware removed.

Referring now to FIGS. 14 and 15, which illustrate differing views of the seed flow controls of power seeder 1. FIG. 14 is a side perspective view of the seed controls of power seeder 1; FIG. 15 is a side perspective view of the seed flow controls of power seeder 1 with the side of the frame, transmission, and depth control level assembly removed. The seed gate 12 may rotate about the front axle shaft 25 to open and close the seed hopper 11. The seed gate 12 may also be utilized to adjust or vary the size of the opening for dispensing seed when the seed gate is in an open position. A mechanism to adjust the seed gate 12 opening may be incorporated into the power seeder 1. In some embodiments, the size of the seed gate 12 opening may be adjusted by the operator moving a seed dial 37 to limit how far the seed gate 12 can be opened. However, this method of adjusting the size of the opening of the seed gate 12 is not to be limited, as other method and mechanisms of adjustment may be recognized by those of skill in the art. In embodiments utilizing a seed dial 37, a T-knob 38 may be used to loosen the seed dial 37 so that the seed dial 37 may be adjusted, and the T-knob may be used to tighten the seed dial 37 once the desired adjustment is reached so that the seed dial 37, and thus the seed gate 12 opening, do not move.

A control rod 48 may connect the seed gate 12 to a bell crank 51, as shown in FIG. 15. The bell crank 51 changes the motion through an angle. The angle of the bell crank may be any angle from 0 to 360 degrees. The bell crank 51 may consist of a generally "L" shaped crank pivoted where the two arms of the L meet. In some embodiments, the connecting rod may attached to a first end of the L arm. In such embodiments, when the control rod 48 is engaged, or pulled, the L rotates around a pivot point. In order to open the seed hopper 10, an operator may move a seed control lever 49 forward (e.g. to the left in FIG. 15). The seed control lever 49 may be connected to the seed control rod 50, which may connect to bell crank 51. The bell crank 51 may take motion from seed control rod 50 and translate that motion to control rod 48 that may be connected to the seed gate 12. The seed gate 12 may be held open by a seed gate spring 54, which is connected to the frame 5 and the bell crank 51, and may limit how much the seed gate 12 may be open. The bell crank 51 may be positioned proximate to, and in some embodiments touching, the seed dial 37 in order to limit the movement, or travel, of the bell crank 51. Furthermore, the seed dial 37 may be utilized to calibrate seed flow (e.g. the amount of seed released from the seed gate 12 over a given time period) when seed flow is "on". Seed flow may be turned "off" by an operator, for example seed flow may be turned off if the operator pulls back (e.g. to the right on FIG. 15) on the seed control lever 49, as this reverses the motion from turning it on.

Figure 16:
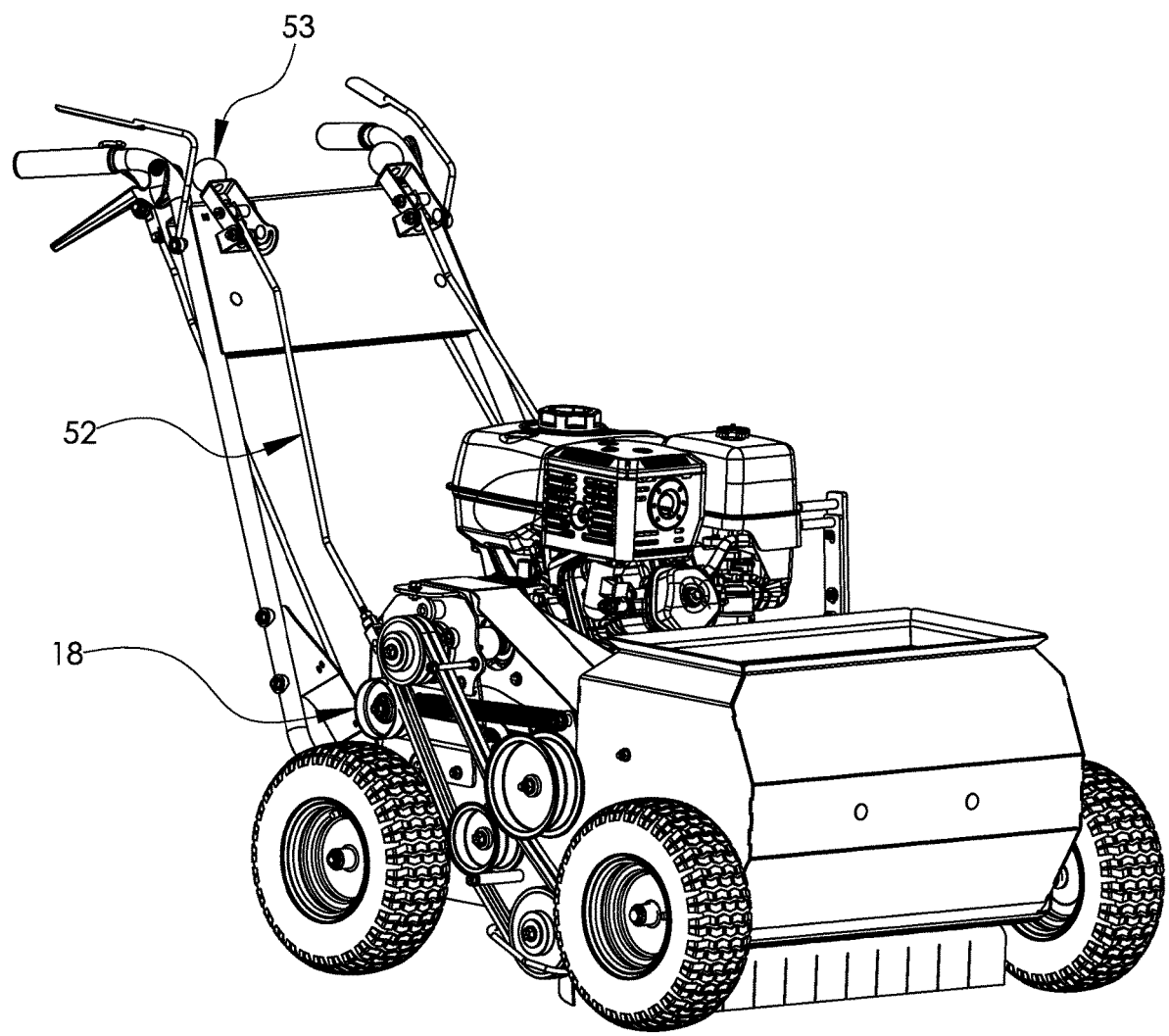
FIG. 16 is a right side perspective view of the blade belt drive and blade controls of the power seeder in FIG. 1 with the belt cover removed.

Referring now to FIG. 16, which illustrates a perspective view of power seeder 1 with the belt cover removed. A blade engagement control lever assembly 53 may be located on, or near, the operator handle assembly 14, although it is not so limited. The blade engagement control lever assembly 53 may be moved in order to engage the control rod 52 in order to move the belt tension idler 18 in order to ultimately engage the blade belts 15. For example, in some embodiments, the blade engagement control lever assembly 53 may rotate forward, the motion of this rotation may translate through the control rod 52 in order to move the belt tension idler 18 forward, which may engage the blade belts 15.

Figure 17:
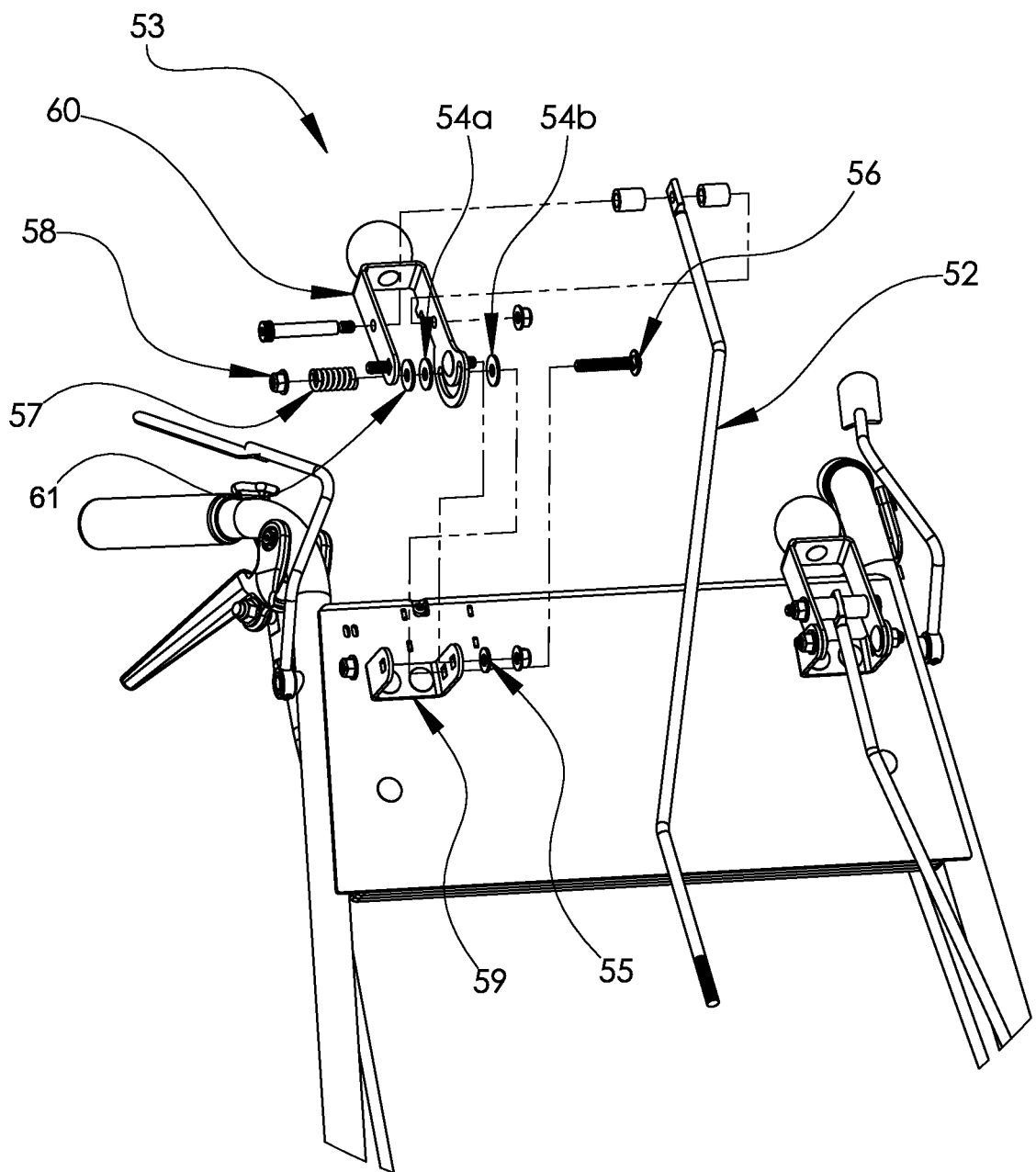
FIG. 17 is a detailed exploded view of the blade engagement controls of the power seeder of FIG. 1.

Referring now to FIG. 17, which illustrates an exploded view of the control lever assembly 53. FIG. 17 shows in detail the friction pack, which may allow the operator to slowly engage the blade belts 15, instead of quickly flipping them on, which may help extend belt life and prevent jerking blade engagement (for example, by quickly flipping the blade control lever assembly 53 forward). The friction pack may include one or more bolts 56 which may pass through a control base bracket 59 and a first friction washer 54a, a control lever 60, a second fiction washer 54b, a metal washer 61, a compression spring 57, and a nut 58 in order to provide compression to the friction washers 54a, 54b. The amount of compression may be adjusted so that the operator is required to slowly engage the blade, which allows for smoothly engaging the blades, without slippage.

Throughout the descriptions of various embodiments herein, the terms dirt and soil may be used interchangeably to refer to the ground in which the seed is to be delivered and/or planted.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A power seeder comprising:
   a frame,
   one or more blades capable of cutting into soil,
   an engine capable of powering the one or more blades,
   a handle including a depth handle and a sliding handle, and
   a plurality of interlocking teeth,
      wherein said plurality of interlocking teeth are disposed between the sliding handle and a depth plate;
      wherein activation of the depth handle disengages the plurality of interlocking teeth allowing movement and adjustment of the height of the one or more blades, and
      wherein deactivation of the depth handle engages the plurality of interlocking teeth preventing movement of the depth handle and sliding handle.

2. The power seeder of claim 1, further comprising a shaft connected to said one or more blades and wherein said handle is connected to said shaft.

3. The power seeder of claim 1, further comprising a seed hopper having an opening for dispensing seed.

4. The power seeder of claim 3, wherein said seed hopper is mounted to said frame such that said opening is located forward of said one or more blades.

5. The power seeder of claim 3, wherein said opening has a seed metering gate.

6. The power seeder of claim 1, wherein said engine is capable of being engaged to cause rotation of said one or more blades and capable of being disengaged to stop rotation of said one or more blades.

7. A power seeder comprising:
   a frame;
   one or more blades capable of cutting into soil,
   an engine capable of powering the one or more blades,
   a depth handle and a sliding handle,
   a plurality of interlocking teeth disposed between the sliding handle and a depth plate;
      wherein activation of the depth handle and sliding handle disengages the plurality of interlocking teeth allowing movement and adjustment of the height of the one or more blades, and
      wherein deactivation of the depth handle and sliding handle engages the plurality of interlocking teeth preventing movement of the depth handle and sliding handle;
   a spring, and
   a shaft connected to the one or more blades, the depth handle, and the spring,
      wherein the depth handle is capable of being activated by a user allowing the depth handle to adjust the height of the one or more blades, and
      wherein the spring provides a load to said shaft to counteract the force of gravity on said one or more blades.

8. The power seeder of claim 7, wherein the movement of said depth handle in a forward direction rotates the shaft against a force being applied to the shaft by the spring to lower the height of the one or more blades.

9. The power seeder of claim 7, wherein the movement of said depth handle in a rearward direction rotates the shaft with the force being applied to the shaft by the spring to raise the height of the one or more blades.

10. The power seeder of claim 7, further comprising a seed hopper having an opening for dispensing seed.

11. The power seeder of claim 10, wherein said seed hopper is mounted to said frame.

12. The power seeder of claim 10, wherein said opening has a seed metering gate.

13. The power seeder of claim 7, wherein said engine is capable of being engaged to cause rotation of said one or more blades and capable of being disengaged to stop rotation of said one or more blades.

* * * * *